(12) United States Patent
Liu et al.

(10) Patent No.: US 7,274,128 B1
(45) Date of Patent: Sep. 25, 2007

(54) LAYERED INORGANIC WITH PILLARED ORGANIC NANOCOMPOSITE ACTUATORS

(75) Inventors: Ping Liu, Thousand Oaks, CA (US); Cameron Massey, Hawthorne, CA (US); Leslie Momoda, Los Angeles, CA (US); Geoffrey P. McKnight, Los Angeles, CA (US); Alan J. Jacobsen, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 383 days.

(21) Appl. No.: 11/038,905

(22) Filed: Jan. 20, 2005

(51) Int. Cl.
*H02N 11/00* (2006.01)
(52) U.S. Cl. ..................................... 310/300
(58) Field of Classification Search ................ 310/300
See application file for complete search history.

(56) References Cited

OTHER PUBLICATIONS

Alberti, et al., Preparation of Nano-Structured Polymeric Proton Conducting Membranes for Use in Fuel Cells, Ann. N.Y. Acad. Sci. 984: 208-225 (2003), pp. 208-225.
Alberti, et al., Shaping Solid-State Supramolecular Cavities: Chemically Induced Accordionlike Movement of γ-Zirconium Phosphate Containing Polyethylenoxide Pillars, Angew. Chem. Int. Ed. 1999, 38, No. 22, pp. 3351-3353.
Burnet, et al., Covalent Bonding of Crown Ethers to γ-Zirconium Phosphate—New Layered Ion Exchangers Showing Selective Recognition, Chem. Eur. J. 1996, 2, No. 12, pp. 1578-1584.

*Primary Examiner*—Evan Pert
(74) *Attorney, Agent, or Firm*—Christopher R. Balzan, Esq.

(57) ABSTRACT

One nanostructured actuator embodiment includes an actuation region between electrical contacts. The actuation region includes an elastic matrix with embedded nanocomposite layered structures, which have inorganic material layers with pillared organic material structures between the inorganic material layers responsive to the surface acidity of the inorganic material layers. The elastic matrix allows transport of species for changing the surface acidity. A separator region is between the electrical contacts. A proton generation region capable of reversible electrochemical production and elimination of protons is provided, which may be a hydrogen storage material located on a side of the separator region opposite the actuation region, which may include metal hydride, or metal hydroxide. Alternatively, it may include an electrolytic solution and conductive particles within the elastic matrix for in situ electrochemical generation of an acid/base. The conductive particles may include carbon nanotubes, metal fibers, and/or metal nanoparticles. The nanocomposite structures may be generally aligned with a direction of work in the elastic matrix.

38 Claims, 3 Drawing Sheets

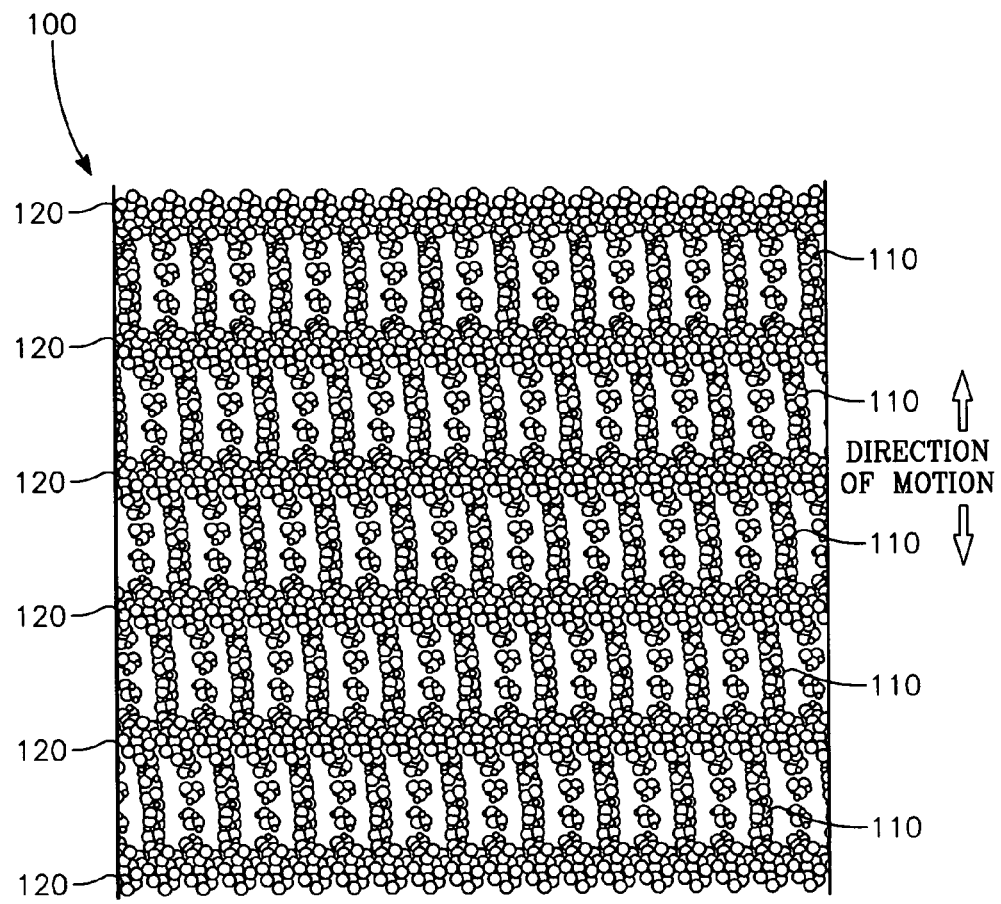
(PRIOR ART) FIG. 1
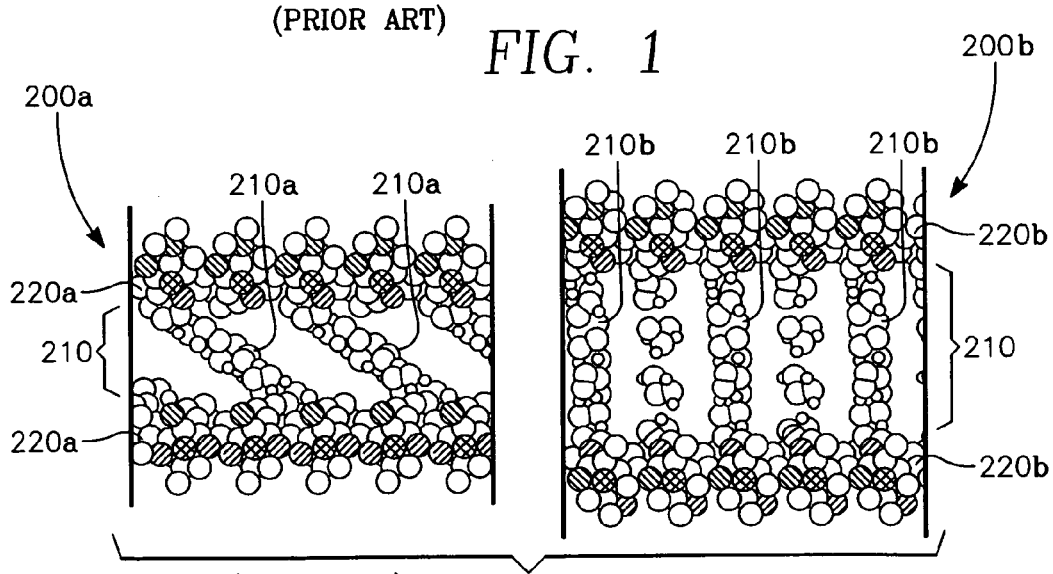
(PRIOR ART) FIG. 2

LAYERED INORGANIC WITH PILLARED ORGANIC NANOCOMPOSITE ACTUATORS

BACKGROUND

Solid state actuators can provide small scale precision positioning capabilities. Solid state actuators are expected to be useful in many industries including aerospace, space, automotive, mobile phone, next generation armed forces concepts, as well as many others.

The reversible actuation mechanism of traditional materials such as shape memory alloy (NiTi), piezoelectric materials, magnetostrictive materials, and electroactive polymers actuation typically have limited strain output and/or stress. This limits the types of applications in which solid state actuators can be used. What is needed is improved solid state actuators that provide high energy density and support large strain output.

SUMMARY

In one embodiment, a nanostructured actuator is provided including an actuation region located between electrical contacts. The actuation region includes nanocomposite layered structures embedded within an elastic matrix. The nanocomposite layered structures have inorganic material layers with pillared organic material structures between the inorganic material layers. The pillared organic material structures have an orientation responsive to a change in the surface acidity of the inorganic material layers. The elastic matrix is adapted to allow transport of chemical species capable of changing the surface acidity of the inorganic material layers. A separator region is located between one of the electrical contacts and the actuation region. A proton generation region located between the electrical contacts is capable of reversible electrochemical production and elimination of protons.

In one embodiment the proton generation region is a hydrogen storage material located on a side of the separator region opposite the actuation region. As such, in certain embodiments, the proton generation region includes metal hydride. In some embodiments, the proton generation region includes metal hydroxide.

In another embodiment the proton generation region includes an electrolytic solution within the elastic matrix and electrically conductive particles embedded within the elastic matrix so as to be capable of electrochemical generation of at least one of an acid or a base from the electrolytic solution. In some embodiments the conductive particles may include carbon nanotubes, metal fibers, and/or metal nanoparticles.

The nanocomposite layered structures may be generally aligned within the elastic matrix so as to be capable of providing displacement along a direction of work. In some embodiments, the nanocomposite layered structures are oriented such that the planes formed by the inorganic material layers are generally facing in a substantially same direction.

In one specific embodiment, the inorganic material layers are γ-zirconium phosphate while the pillared organic material structures are polyethylenoxide. Many other embodiments of the invention are possible.

BRIEF DESCRIPTION OF THE DRAWINGS

The features and advantages of the present invention will be better understood with regard to the following description, appended claims, and accompanying drawings where:

FIG. 1 illustrates a molecular scale cut away side view of a layered nanocomposite material.

FIG. 2 illustrates an enlarged molecular scale cut away side view layered nanocomposite material with pillared organic material in a "laying down" configuration between two inorganic layers and in a "standing up" configuration between two inorganic material layers.

DESCRIPTION

Layered Nanocomposite Material

FIGS. 1 and 2

Figure 3:
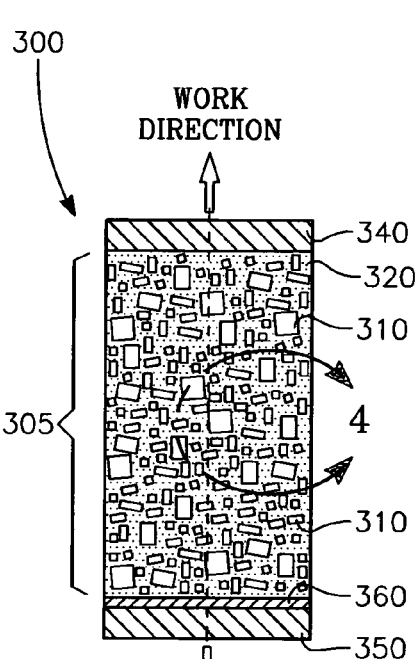
FIG. 3 is a cross sectional side view of an actuator in accordance with an embodiment of the invention.

FIG. 1 illustrates a molecular scale cut away side view of a layered nanocomposite material 100. Layered composite materials 100 can provide molecular scale changes in the physical architecture of its components. Layered composite materials 100 formed of inorganic material layers 120 with organic molecular chains 110 linked between the inorganic material layers can provide a mechanism for nanoscale, as well as macroscale actuation. Specifically, the organic molecular chains 110 have a pillared structure that can be made to change orientation in response to changes in the surface acidity of the inorganic material layers 120, as discussed below with reference to FIG. 2. The distance between the inorganic material layers 120 increases or decreases in response to changes in surface acidity of the inorganic material layers 120.

A reversible dimensional change in zirconium phosphate-polyethlyenoxide composite nanostructures was observed by Alberti et al. in Shaping Solid-State Supramolecular Cavities: Chemically Induced Accordion-Like Movement of γ-Zirconium Phosphate (γ-ZrP) Containing Polyethylenoxide Pillars, Angew. Chem. Int. Ed., Vol. 38, No. 22, pp. 3351-3353 (1999), herein incorporated by reference. In this composite structure, polyethylenoxide diphosphonate intercalates between layers of γ-ZrP, with its configuration sensitive to the surface acidity of the zirconium phosphate inorganic layer. The nanocomposite has a general chemical composition of $ZrPO_4[O_2P(OH)_2]_{0.76}(O_2P-(OH)-R-(OH)PO_2)_{0.12} \cdot nH_2O$ where R is $-O-(CH_2CH_2O)m-O-$ and m determines the length of the organic pillar. During the intercalation of polyethylenoxide diphosphonate, each molecule acts as a tetradentate ligand and replaces two bidentate $O_2P(OH)_2$ ligands belonging to two adjacent lamellae of the original γ-ZrP.

The γ-zirconium phosphate has a layered structure, with free water and protons residing between the layers, resulting in a strong acidity on the surface. Shown in FIG. 2, molecular chains of ethylene glycol pillars 210*a* tend to be parallel to the inorganic zirconium phosphate layers 220*a*. This is due to strong hydrogen bonding between oxygen in the ethylene glycol molecules of the pillars 210a and the acidic surface groups of zirconium phosphate 220a. This is shown as a "laying down" configuration 200a.

Neutralization of the surface acidity disrupts the hydrogen bonds, allowing the molecular chain pillars 210b to adopt a configuration with the molecular chain pillars 210b vertical to the inorganic zirconium phosphate layers 220b. This is shown as a "standing up" configuration 200b, causing a one-dimensional volume expansion. For example, when methyl amine, a basic compound, intercalates between the ZrP layers 220b, it greatly reduces the surface acidity and causes a volume expansion. Addition of an acid such as HCl reverses the reaction.

By chemically inducing a change in the orientation of the pillars with respect to the γ-zirconium phosphate layers 220, anisotropic swelling or contraction can be achieved that may be utilized to perform work as a solid state actuator as discussed below.

Dimensional changes of 38% and 52% for the column layers 210 have been reported for two polyethylenoxide pillars for the number of repeating ethylene glycol units (m in the chemical formula) being 1 and 4, respectively. Conceivably, longer pillar lengths with increasing value in m could be produced to yield greater dimensional changes. In addition, it has been observed that during the enlargement/ shortening of the interlayer space, the nanocomposite goes through many intermediate stages. As a result, fixing the acidity of the γ-ZrP layer stabilizes the structure at any point between the two end states, providing for zero-power hold in an actuator configuration.

There are many possible layered structure nanocomposite materials. For example, layered silicates can act as hosts when organic molecules and polymers can intercalate between the inorganic silicate layers. Nanocomposites formed between polymers and exfoliated layered silicates can greatly modify important properties of the polymers, such as inflammability, permeability to neutral or ionic species, mechanical resistance, and thermal stability. Other inorganic compounds with 2-D layered structures include double oxides, aluminum phosphates, and vanadium oxides, to name a few.

Many materials may be used to provide actuator embodiments with structural properties similar to ceramics. Ceramic like properties result from the strong chemical bonding in the layers, while the interactions between the layers are weak and mostly Van der Walls in nature. This structural feature allows the intercalation of a variety of organic molecules between a variety of inorganic layers, to provide significant anisotropic swelling of the structure for use in actuator embodiments discussed below.

ACTUATOR EMBODIMENTS

FIGS. 3-5

Turning to FIG. 3, the chemically induced dimensional change mechanism discussed above is incorporated into an actuator assembly 300, capable of yielding a micro, or even macro scale realization of the molecular scale change in architecture. In particular, certain embodiments of our invention incorporate a plurality of nanocomposite material pieces 310 in a matrix material 320, and further incorporate an electrochemical means to transform the mechanism stimulus from pH to applied voltage.

FIG. 3 is a cross sectional side view of an actuator assembly 300 in accordance with one embodiment of the invention. An actuation region 305 is located between electrical contacts 340 and 350. The electrical contacts 340 and 350 are formed of electrically conductive material, such as for example gold, or another conductor. A separator region 360 is located between the actuation region 305 and the electrical contact 350.

The separator region 360 provides physical isolation to inhibit electrical shorting, while allowing the flow of ions between the electrical contact 350 and the actuation region 305. The separator region 360 may be a porous polymer membrane, such as polypropylene, which is impregnated with an aqueous solution of a salt, such as sodium sulfate or $Na_2SO_4$.

Figure 4:
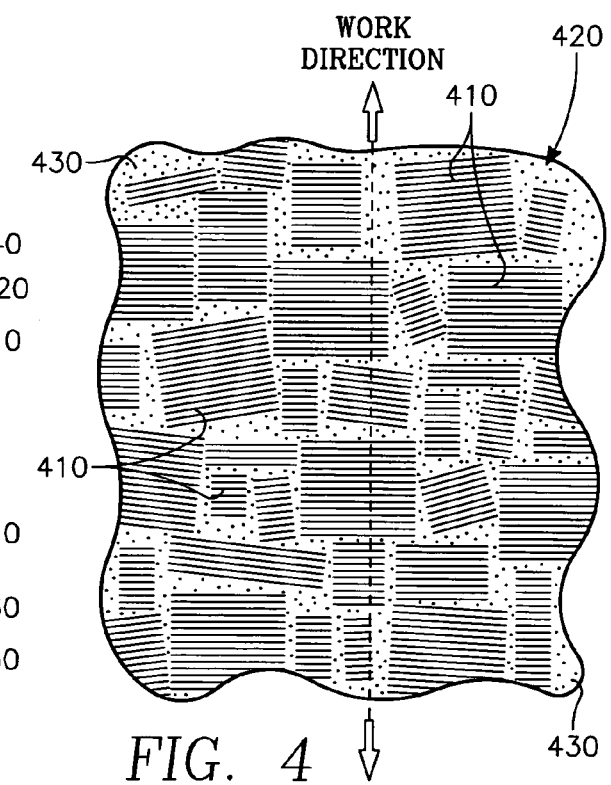
FIG. 4 shows a cut away exploded view of the actuation region 305 along the 4-4 line of FIG. 3.

FIG. 4 shows a cut away exploded view of the actuation region 305 along the 4-4 line of FIG. 3. The actuation region 305 includes a plurality of nanocomposite layered structure pieces 410 embedded within a matrix 420. In this embodiment, the matrix 420 is an elastic material so that it transfers the volume expansion of the nanocomposite layered structure pieces 410.

Furthermore, the elastic matrix 420 is a material capable of allowing transport of chemical species capable of changing the surface acidity of the inorganic material layers 120, shown in FIG. 1, of the nanocomposite pieces 410. The elastic matrix may be an elastic ion conducting polymer, such as Nafion or polyaryletherketones. Other elastic ion conducting materials are possible.

The nanocomposite layered structure pieces 410 have inorganic material layers 120 with pillared organic material structures 110, as illustrated in FIG. 1. Thus, the nanocomposite pieces may be γ-ZrP pillared by polyethylenoxide composited into nanostructures.

The nanocomposite layered structure pieces 410 are generally aligned within the elastic matrix 420 so that the direction of work of most of the of nanocomposite layered structure pieces 410 is facing in a substantially similar direction so as to provide an overall work direction (indicated by the arrows in FIG. 4). Thus, the nanocomposite layered structure pieces 410 may be generally oriented such that the planes of the inorganic material layers (illustrated by parallel lines within the nanocomposite layered structure pieces 410) of the plurality of nanocomposite layered structures pieces 410 are generally facing in a substantially same direction. The inorganic material layers of the different nanocomposite layered structure pieces 410 may be in substantially parallel planes with respect to the other nanocomposite layered structure pieces, and perpendicular to the work direction (indicated by the arrows in FIG. 4).

Alignment of the nanocomposite layered structure pieces 410 may be accomplished using an electric field during fabrication, by spin coat deposition of the active region onto a substrate (which may have other deposition layers on it), and/or by other alignment means. The use of shaped nanocomposite layered structure pieces 410 may be employed to achieve the same effect. For example, nanocomposite layered structure pieces 410 of rod, fiber, tube, or other elongated shape may be utilized to assist in alignment, or to provide self-aligned of the nanocomposite layered structure pieces 410.

Figure 5:
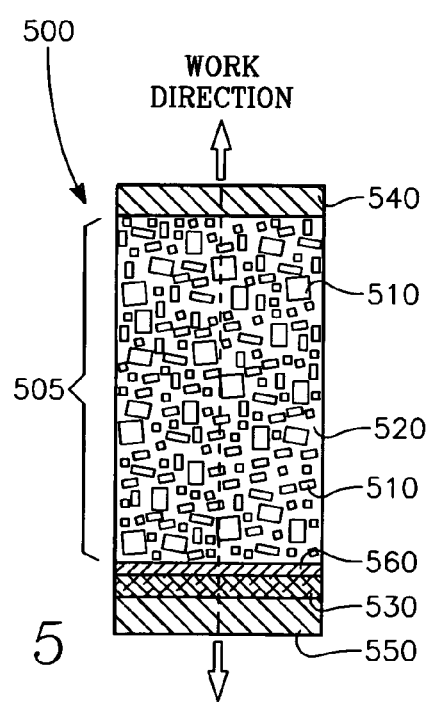
FIG. 5 is a cross sectional side view of an actuator in accordance with an embodiment of the invention.

Although the nanocomposite structure pieces 310, 410, and 510, in FIGS. 3-5 respectively, are shown separated by relatively large spacing for illustration purposes, they may be more densely packed. Moreover, it is possible to have one, or several continuous nanocomposite layered structure piece(s), not shown, extending to (or near) adjacent regions, structures, or layers. For example, one, or several nanocomposite layered structure(s), not shown, having a continuous stack of layers may extend from (or nearly from) the contact 340 to (or nearly to) the separator 360.

In the embodiment of FIGS. 3 and 4, within the matrix 420 are conductive particles 430, which provide a proton generation region within the matrix material 420. The conductive particles 430 are embedded within the elastic matrix 420 to allow electrochemical generation and/or elimination of protons. Conductive particles 430 enable an electrochemical reaction to generate acid or base in-situ while the ion conducting polymer matrix 420 provides pathways to transport the ions to the γ-ZrP/PO nanocomposite layered structure pieces 410.

The conductive particles 430 may include metal particles, carbon nanotubes, other conductive nanoparticles, or the like. Carbon nanotubes are expected to be a better choice over metal particles due to their high aspect ratios leading to a low percolation concentration.

In this embodiment, actuation occurs by electrochemical means so that the acid or base is generated in-situ by an electrochemical reaction. Thus, the active region 305 may include a compound capable of electroreduction, such as a salt, for example sodium sulfate or $Na_2SO_4$. During operation, an electroreduction of sulfate generates $OH^-$ ions that neutralize the acidity of γ-ZrP to cause actuation. Thus, in some embodiments, when a current is applied across the actuation region in one direction, $OH^-$ ions are generated, and when the direction of current across the actuation region is reversed, protons or $H^+$ ions are generated (or $OH^-$ is removed). The matrix 420 allows the transport of chemical species to effect the change of acidity of the γ-ZrP and also binds the nanocomposites mechanically.

In this embodiment, conductive particles 430 provide proton generation and/or elimination near and around the nanocomposite layered structure pieces 410. Because the proton generation/elimination occurs in proton generation regions near and around the nanocomposite layered structure pieces 410, ion transport distance between generation sites provided by conductive particles 430 and the nanocomposite layered structure pieces 410 is shorter. Shorter ion transport distances reduces actuator response time.

FIG. 5 is a cross sectional side view of an actuator assembly 500 in accordance with another embodiment of the invention. The actuation region 505 is located between electrical contacts 540 and 550. In the embodiment of FIG. 5, the proton generation region 530 is a layer, between the separation region 560 and the electrical contact 550. Thus, the proton generation region 530 is separated from the actuation region 505 by the separator region 560. The proton generation region 530 may be or have a metal hydride, or the like that supplies/removes protons to/from the actuation region 505. In other embodiments, the proton generation region 530 may be or have a metal hydroxide, or the like that supplies/removes protons to/from the actuation region 505.

As discussed above, the separator region 560 provides isolation to inhibit electrical shorting while allowing the flow of protons between the electrical contact 350 and the actuation region 305. The separator region 360 may be a porous polymer membrane, such as polypropylene, which is impregnated with an aqueous solution of a salt, such as sodium sulfate or $Na_2SO_4$.

The actuation region 505 includes a plurality of nanocomposite layered structure pieces 510 embedded within an elastic matrix 520. The nanocomposite layered structure pieces 510 have inorganic material layers 120 with pillared organic material structures 110, as illustrated in FIG. 1. Thus, the nanocomposite pieces may be γ-ZrP pillared by polyethylenoxide.

The elastic matrix 520 is a material capable of allowing transport of chemical species capable of changing the surface acidity of the inorganic material layers 120, shown in FIG. 1, of the nanocomposite layered structure pieces 510. The elastic matrix 520 may be an elastic ion conducting polymer, such as Nafion or polyaryletherketones. Other elastic ion conducting materials are possible. Because a proton generation region 530 is located separate from the actuation region 505 conductive particles are not utilized in the embodiment shown in FIG. 5. In other embodiments (not shown), however, conductive particles may be included in the elastic matrix 520 in addition to a separate proton generation region, if desired.

In yet another alternate embodiment, a direct chemical mechanism may be acceptable, or even preferable, in some applications. In this case, a porous elastic matrix would allow for the distribution of an acidic or basic solution into the nanocomposites. The acidic or basic solution could be supplied under pressure in such embodiments.

Figure 6:
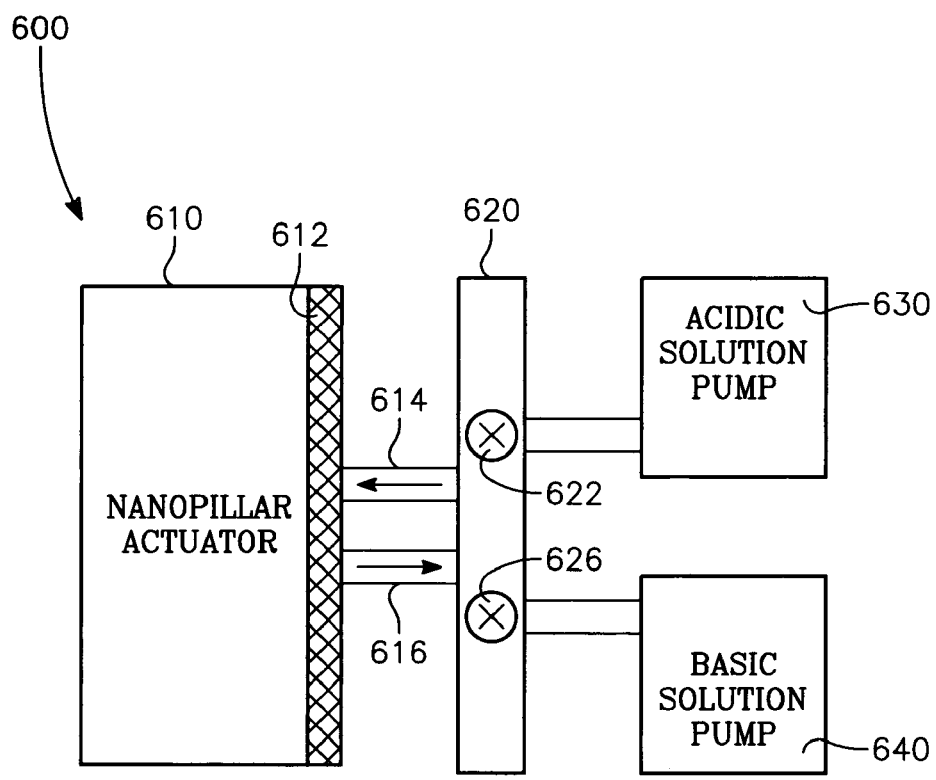
FIG. 6 is a simplified functional diagram of an actuator assembly in accordance with an embodiment having a direct chemical mechanism to allow into introduction and transport of chemical species.

FIG. 6 illustrates a simplified functional diagram of an actuator assembly 600 in accordance with an embodiment having a direct chemical mechanism to allow introduction and transport of chemical species. In this simplified example, acid or base solutions may be supplied via pumps 630 or 640 and valves 622 and 626 which allow the fluid to be distributed to the actuation region 610. Inlet 614 and outlet 616 paths allow the actuation region 610 to be cycled alternately between the acidic and basic states. A valve manifold and controller system 620 may be electronically controlled to provide proportional control the actuator state by varying the pH of the working solution of the actuation region 610.

An optional flow distribution material 612 may be included between the inlet 614 and the actuation region. The flow distribution material 612 is typically a porous material, that may be flexible in some embodiments. It is possible in certain embodiments, that in addition to actuation resulting from a change of the pH of the actuation region 610, hydraulic pressure may be utilized in conjunction with pH change, if desired. The example of FIG. 6 is for illustration purposes. The various components, i.e. the pumps 630 and 640, the valve manifold and controller 620, the inlet and outlet 614 and 616, and the flow distribution material 612, may have various positions, interconnections, configurations, and embodiments. Furthermore, not all of these components are necessary in all embodiments.

Large swelling is possible utilizing ion transport to manipulate the organic/inorganic architecture. Specifically, rotation of the organic molecule molecules within the inorganic structure using chemical or electrochemical means may be exploited to cause macroscale anisotropic swelling.

The transport of small molecules and ions provides fast actuation kinetics. In some embodiments, the rate of transformation is expected to be in the range of seconds to minutes between the end states. The actuation rate depends substantially on how quickly the column layers can be ionized/deionized.

Moreover, in some embodiments, the nanocomposite is a composite made of ceramic particles with a high elastic modulus. Such embodiments, based on materials of relatively large elastic modulus connected in a structurally stiff architecture, are expected to provide a desirable combination of 10-50% strain range and megapascal range output stress. It is anticipated by the present inventors that high blocking forces (Megapascal range) and large energy densities (>1 $MJ/m^3$) are realizable. While some materials are available with strain in this range, including electroactive gels, these materials are composed of extremely low modulus materials and are consequently limited to very low stress output.

Having described this invention in connection with a number of embodiments, modification will now certainly suggest itself to those skilled in the art. As such, the invention is not to be limited to the disclosed embodiments except as required by the appended claims.

What is claimed is:

1. A nanostructured actuator comprising:
   a) electrical contacts;
   b) an actuation region between the electrical contacts, the actuation region comprising:
      (i) a plurality of nanocomposite layered structures each comprising:
         (1) inorganic material layers having surface acidity; and
         (2) pillared organic material structures between the inorganic material layers, the pillared organic material structures having an orientation responsive to a change in the surface acidity of adjacent inorganic material layers; and
      (ii) an elastic matrix holding the plurality of nanocomposite layered structures embedded within, the elastic matrix being adapted to allow transport of chemical species capable of changing the surface acidity of the inorganic material layers;
   c) a separator region between the electrical contacts; and
   d) a proton generation region between the electrical contacts capable of reversible electrochemical production and elimination of protons.

2. The actuator of claim 1 wherein the proton generation region comprises a hydrogen storage material located on a side of the separator region opposite the actuation region and located between one of the electrical contacts and the separator region.

3. The actuator of claim 2 wherein the proton generation region comprises metal hydride.

4. The actuator of claim 2 wherein the proton generation region comprises metal hydroxide.

5. The actuator of claim 1 wherein the proton generation region comprises:
   a) an electrolytic solution within the elastic matrix; and
   b) electrically conductive particles embedded within the elastic matrix so as to be capable of electrochemical generation of at least one of an acid or a base from the electrolytic solution.

6. The actuator of claim 5 wherein the conductive particles comprise at least one of: (a) carbon nanotubes; (b) metal fibers; or (c) metal nanoparticles.

7. The actuator of claim 6 wherein the electrolytic solution comprises a salt.

8. The actuator of claim 7 wherein the electrolytic solution comprises $Na_2SO_4$.

9. The actuator of claim 1 wherein each of the plurality of nanocomposite layered structures have a direction of work, and wherein the plurality of nanocomposite layered structures are oriented such that the direction of work of each of the plurality of nanocomposite layered structures is facing in a substantially similar direction.

10. The actuator of claim 1 wherein the inorganic material layers form planes, and wherein the plurality of nanocomposite layered structures are oriented such that the planes of the inorganic material layers are generally facing in a substantially same direction.

11. The actuator of claim 1 wherein the elastic matrix comprises an ion conducting polymer.

12. The actuator of claim 11 wherein the elastic matrix comprises one of: (a) Nafion; or (b) polyaryletherketone.

13. The actuator of claim 1 wherein the inorganic material layers are comprised of γ-zirconium phosphate.

14. The actuator of claim 13 wherein the pillared organic material structures comprise polyethylenoxide.

15. The actuator of claim 1 wherein the inorganic material layers comprise one of: (a) silicate; (b) double oxides, (c) aluminum phosphate; or (d) vanadium oxide.

16. The actuator of claim 1 wherein the pillared organic material structures comprise molecular chains of ethylene glycol.

17. The actuator of claim 1 wherein the separator comprises a porous polymer membrane impregnated with an aqueous electrolyte solution.

18. The actuator of claim 1 wherein the proton generation region comprises electrically conductive portions within an electrolytic solution so as to be capable of electrochemical production and elimination of protons within the electrolytic solution, the electrolytic solution surrounding the each of the plurality of nanocomposite layered structures so as to be capable of transporting ions between the conductive portions and the plurality of nanocomposite layered structures for changing the surface acidity of the inorganic material layers.

19. A nanostructured actuator comprising:
   a) electrical contacts;
   b) an actuation region comprising:
      (i) a nanocomposite layered structure between the electrical contacts comprising:
         (1) inorganic material layers having surface acidity; and
         (2) organic material chains linked between the inorganic material layers such that the organic material chains rotate in response to a change in the surface acidity of adjacent inorganic material layers; and
      (ii) an ion conducting matrix the nanocomposite layered structure being embedded within the ion conducting matrix, the ion conducting matrix being adapted to allow transport of chemical species capable of changing the surface acidity of the inorganic material layers;
   c) a separator region between the electrical contacts; and
   d) a region between the electrical contacts capable of reversible electrochemical production and elimination of chemical species capable of changing the surface acidity of the inorganic material layers.

20. The actuator of claim 19 wherein the region between the electrical contacts capable of reversible electrochemical production and elimination of chemical species comprises electrical conducting particles embedded within the ion conducting matrix so as to be capable of in situ electrochemical generation of at least one of an acid or a base.

21. The actuator of claim 19 wherein the region between the electrical contacts capable of reversible electrochemical production and elimination of chemical species comprises at least one of a metal hydride region or a metal hydroxide region located between the electrical contacts.

22. The actuator of claim 19 wherein the inorganic material layers comprise one of: (a) zirconium phosphate; (b) silicate;
(c) double oxides, (d) aluminum phosphate; or (e) vanadium oxide.

23. The actuator of claim 19 wherein the nanocomposite layered structure comprises γ-zirconium phosphate layers and molecular chains comprising ethylene glycol.

24. A nanostructured actuator comprising:
a) electrical contacts;
b) an actuation region between the electrical contacts, the actuation region comprising:
  (i) a plurality of nanocomposite layered structures comprising:
    (1) inorganic material layers having surface acidity; and
    (2) pillared organic material structures linked between the layered inorganic material, the pillared organic material structures having an orientation responsive to a change in the surface acidity of adjacent inorganic material layers;
  (ii) an elastic matrix holding the plurality of nanocomposite layered structures embedded within, the elastic matrix being adapted to allow transport of chemical species capable of changing the surface acidity of the inorganic material layers; and
  (iii) the plurality of nanocomposite layered structures being generally aligned within the elastic matrix so as to be capable of providing displacement along a direction of work;
c) a hydrogen storage region located between the electrical contacts, the hydrogen storage region being capable of reversible production and elimination of protons in response to electrical signals across the hydrogen storage region; and
d) a separator region between the actuation and the hydrogen storage region.

25. The actuator of claim 24 wherein the hydrogen storage region comprises at least one of: (a) metal hydride; or (b) metal hydroxide.

26. The actuator of claim 25 wherein the plurality of nanocomposite layered structures comprise γ-zirconium phosphate layers and polyethylenoxide chains between the γ-zirconium phosphate layers.

27. The actuator of claim 24 wherein the inorganic material layers comprise one of: (a) zirconium phosphate; (b) silicate; (c) double oxides, (d) aluminum phosphate; or (e) vanadium oxide.

28. A nanostructured actuator comprising:
a) electrical contacts;
b) an actuation region between the electrical contacts, the actuation region comprising:
  (i) a plurality of nanocomposite layered structures comprising:
    (1) inorganic material layers having surface acidity; and
    (2) pillared organic material structures linked between the layered inorganic material, the pillared organic material structures having an orientation responsive to a change in the surface acidity of adjacent inorganic material layers;
  (ii) an elastic matrix holding the plurality of layered nanocomposite structures embedded within, the elastic matrix including a chemical compound capable of dissociation to proved chemical species capable of changing the surface acidity of the inorganic material layers, the elastic matrix being adapted to allow transport of the chemical species;
  (iii) electrically conductive particles embedded within the elastic matrix; and
  (iv) the plurality of nanocomposite layered structures being generally aligned within the elastic matrix so as to be capable of providing displacement along a direction of work; and
c) a separator region between the actuation region and one of the electrical contacts.

29. The actuator of claim 28 wherein the conductive particles comprise at least one of: (a) carbon nanotubes; (b) metal fibers; or (c) metal nanoparticles.

30. The actuator of claim 29 wherein the plurality of nanocomposite layered structures comprise γ-zirconium phosphate layers and polyethylenoxide chains between the γ-zirconium phosphate layers.

31. The actuator of claim 29 wherein the inorganic material layers comprise one of: (a) zirconium phosphate; (b) silicate;
  (c) double oxides, (d) aluminum phosphate; or (e) vanadium oxide.

32. A nanostructured actuator comprising:
a) electrical contacts;
b) an actuation region between the electrical contacts, the actuation region comprising:
  (i) a plurality of nanocomposite layered pieces each comprising:
    (1) inorganic material layers having surface acidity; and
    (2) pillared organic material structures between the inorganic material layers, the pillared organic material structures having an orientation responsive to a change in the surface acidity of adjacent inorganic material layers;
  (ii) an elastic matrix holding the plurality of nanocomposite layered pieces embedded within, the elastic matrix being adapted to allow transport of chemical species capable of changing the surface acidity of the inorganic material layers; and
  (iii) the plurality of nanocomposite layered pieces being generally aligned within the elastic matrix so as to be capable of providing displacement along a direction of work;
c) a separator region between the electrical contacts; and
d) a region between the electrical contacts capable of reversible electrochemical production and elimination of chemical species capable of changing the surface acidity of the inorganic material layers.

33. The actuator of claim 32 wherein the plurality of nanocomposite layered pieces comprise γ-zirconium phosphate layers and polyethylenoxide chains between the γ-zirconium phosphate layers.

34. The actuator of claim 32 wherein the inorganic material layers comprise one of: (a) zirconium phosphate; (b) silicate; (c) double oxides, (d) aluminum phosphate; or (e) vanadium oxide.

35. A nanostructured actuator comprising:
a) a nanocomposite layered structure comprising:
  (i) inorganic material layers having surface acidity; and
  (ii) organic material chains linked between the inorganic material layers such that the organic material chains rotate in response to a change in the surface acidity of adjacent inorganic material layers; and
b) a porous elastic matrix, the nanocomposite layered structure being embedded within porous elastic matrix, the porous elastic matrix being adapted to allow introduction and transport of chemical species capable of changing the surface acidity of the inorganic material layers.

36. The actuator of claim 35 further comprising a supply apparatus capable of supplying at least one of an acidic solution or a basic solution under pressure to the nanocomposite layered structure.

37. The actuator of claim 36 wherein the inorganic material layers comprise one of: (a) zirconium phosphate; (b) silicate; (c) double oxides, (d) aluminum phosphate; or (e) vanadium oxide.

38. The actuator of claim 36 wherein the nanocomposite layered structure comprises γ-zirconium phosphate layers and molecular chains comprising ethylene glycol.

* * * * *